US011020771B2

(12) United States Patent
Smith

(10) Patent No.: US 11,020,771 B2
(45) Date of Patent: Jun. 1, 2021

(54) APPARATUS FOR SORTING GEMSTONES

(71) Applicant: De Beers UK Ltd, London (GB)

(72) Inventor: James Gordon Charters Smith, Buckinghamshire (GB)

(73) Assignee: De Beers UK Ltd, London (GB)

( * ) Notice: Subject to any disclaimer, the term of this patent is extended or adjusted under 35 U.S.C. 154(b) by 90 days.

(21) Appl. No.: 16/337,349

(22) PCT Filed: Sep. 28, 2017

(86) PCT No.: PCT/GB2017/052917
§ 371 (c)(1),
(2) Date: Mar. 27, 2019

(87) PCT Pub. No.: WO2018/060717
PCT Pub. Date: Apr. 5, 2018

(65) Prior Publication Data
US 2019/0337021 A1 Nov. 7, 2019

(30) Foreign Application Priority Data
Sep. 30, 2016 (GB) ...................................... 1616683

(51) Int. Cl.
*B07C 5/02* (2006.01)
*B07C 5/36* (2006.01)
(Continued)

(52) U.S. Cl.
CPC ................ *B07C 5/362* (2013.01); *B07C 5/02* (2013.01); *B07C 5/3425* (2013.01); *G01N 21/87* (2013.01); *G01N 2021/845* (2013.01)

(58) Field of Classification Search
CPC ......... B07C 5/362; B07C 5/02; B07C 5/3425; G01N 21/87; G01N 2021/845
See application file for complete search history.

(56) References Cited

U.S. PATENT DOCUMENTS 3,980,180 A * 9/1976 Jamieson .............. B07C 5/3416
209/565
4,726,898 A * 2/1988 Mills ........................ B07C 5/02
209/545
(Continued)

FOREIGN PATENT DOCUMENTS

CN 1432438 A 7/2003
CN 104169011 A 11/2014
(Continued)

OTHER PUBLICATIONS

"Gemstone" definition. Merrium Webster Dictionary [online],[retrieved on Dec. 7, 2020]. Retrieved from the Internet: <https://www.merriam-webster.com/dictionary/gemstone>.*
(Continued)

*Primary Examiner* — Patrick H Mackey
(74) *Attorney, Agent, or Firm* — Renner, Otto, Boisselle & Sklar, LLP

(57) ABSTRACT

An apparatus for sorting gemstones from a batch of gemstones comprises one or more measurement locations, a conveyor comprising a plurality of discrete compartments for containing the gemstones, a delivery device configured to deliver individual gemstones from the batch of gemstones to individual compartments of the conveyor and a controller configured to synchronise a speed of the conveyor with an operation of the one or more measurement locations such that the measurements of the gemstones can be correlated with a location of the gemstones in their associated compartments. A method of sorting gemstones from a batch of gemstones is also disclosed.

32 Claims, 13 Drawing Sheets

(51) Int. Cl.
  *B07C 5/342* (2006.01)
  *G01N 21/87* (2006.01)
  *G01N 21/84* (2006.01)

(56) References Cited

U.S. PATENT DOCUMENTS

| | | | | |
|---|---|---|---|---|
| 5,042,637 A * | 8/1991 | LaVars | ................... | B07C 5/362 |
| | | | | 198/370.02 |
| 5,058,749 A * | 10/1991 | Jong | ........................ | B07C 5/02 |
| | | | | 198/394 |
| 5,174,429 A * | 12/1992 | La Vars | ................. | B07C 5/362 |
| | | | | 198/370.02 |
| 5,419,441 A * | 5/1995 | Hirsch | .................... | B21G 1/00 |
| | | | | 209/587 |
| 5,505,313 A * | 4/1996 | Smith | .................... | G01N 21/87 |
| | | | | 209/579 |
| 5,626,236 A * | 5/1997 | Hiebert | ............... | B65G 47/965 |
| | | | | 209/538 |
| 6,879,389 B2 * | 4/2005 | Meyer | ...................... | B07C 5/02 |
| | | | | 209/557 |
| 8,373,081 B2 * | 2/2013 | Ackley | ............. | G01N 21/9508 |
| | | | | 209/580 |
| 9,372,155 B2 * | 6/2016 | Yokozaki | ............... | G01N 33/12 |
| 9,618,443 B2 | 4/2017 | Smith et al. | | |
| 2014/0264024 A1 * | 9/2014 | Nakayama | ......... | G01N 21/9508 |
| | | | | 250/338.1 |

FOREIGN PATENT DOCUMENTS

| | | | | |
|---|---|---|---|---|
| CN | 104826816 A | 8/2015 | | |
| CN | 204564599 U | 8/2015 | | |
| GB | 2215041 A | 9/1989 | | |
| GB | 2278440 A | 11/1994 | | |
| RU | 2424859 C1 | 7/2011 | | |
| RU | 2014139583 A | 10/2014 | | |
| WO | 2011037481 | 3/2011 | | |
| WO | 2013135781 | 3/2013 | | |
| WO | WO-2013135781 A1 * | 9/2013 | ........... | G01N 33/381 |
| WO | 2014/067932 A1 | 5/2014 | | |

OTHER PUBLICATIONS

"Mineral" definition. Merrium Webster Dictionary [online],[retrieved on Dec. 7, 2020]. Retrieved from the Internet: <https://www.merriam-webster.com/dictionary/gemstone>.*

International Preliminary Report on Patentability (IPRP) for corresponding App. No. PCT/GB2017/052917, dated Apr. 2, 2019.

International Search Report and Written Opinion for corresponding App. No. PCT/GB2017/052917, dated Dec. 5, 2017.

Search Report for corresponding GB Patent App. No. 1616683.7, dated Mar. 7, 2017.

* cited by examiner

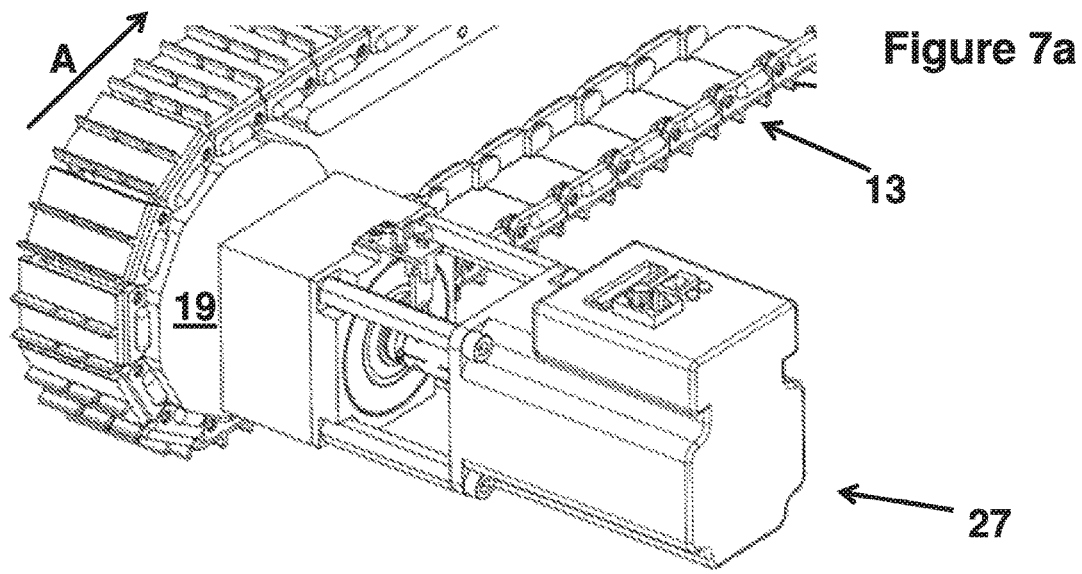
Figure 7a
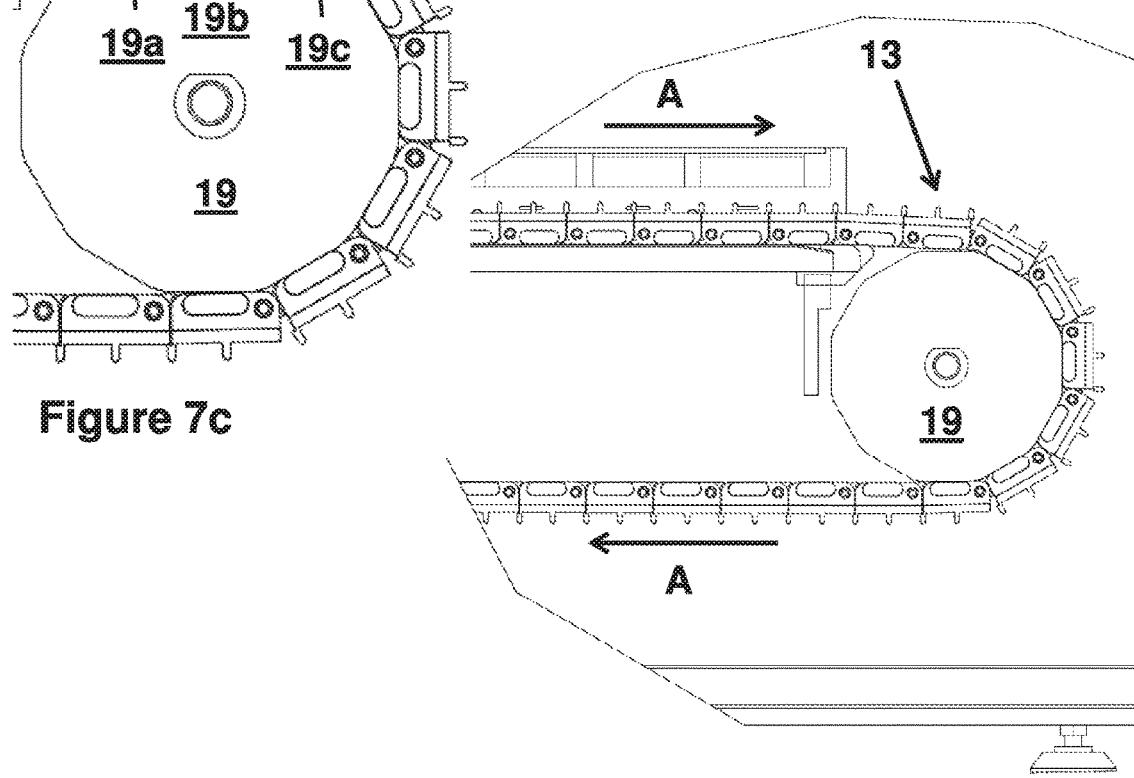
Figure 7b
Figure 7c

APPARATUS FOR SORTING GEMSTONES

TECHNICAL FIELD

The present invention relates to an apparatus and a method for sorting gemstones. Specifically, but not exclusively, the invention relates to an apparatus and a method for sorting rough gemstones, and in particular diamonds.

BACKGROUND

A parcel of rough gemstones such as diamonds may be obtained as the output of a mining process, where it is referred to as a Run of Mine (RoM). Additionally, parcels may be obtained commercially. Typically, parcels of rough diamonds will have been sieved so that the particles contained therein are substantially within a specified size range. For example, a −7+5 RoM parcel of rough diamonds will largely comprise rough diamonds that will pass through a No. 7 sieve plate but not a No. 5. Such sieve plate sizes are a de facto standard in the diamond trade.

While such a parcel is typically standardised with respect to size, the material contained therein may well vary in terms of clarity, colour, size and shape. Therefore, someone contemplating the purchase or sale of a parcel may have little idea of the fair price that should be agreed. The price will be driven by the value of the polished gemstones that can be manufactured from the parcel.

To value a parcel of rough diamonds, or even a parcel of polished stones, the purchaser must somehow inspect the parcel and form an opinion based on an appraisal of the goods. In order to do this, the various properties of each individual stone must be measured separately in some way. It would be preferable to be able to separate the parcel of stones into individual diamonds, and then measure the various properties of the diamond using a single apparatus.

In some circumstances it may also be useful to sort a parcel or batch of rough diamonds into separate parcels on the basis of parameters such as clarity, colour, size and shape. It would be desirable to carry out such sorting in an automated manner.

SUMMARY

In accordance with one aspect of the present invention there is provided an apparatus for sorting gemstones from a batch of gemstones. The apparatus comprises one or more measurement locations, each comprising at least one sensor configured to measure one or more properties of a gemstone. The apparatus further comprises a conveyor comprising a plurality of discrete compartments for containing the gemstones, the conveyor being driven by a motor so as to transport the gemstones in the compartments to the one or more measurement locations. A delivery device is configured to deliver individual gemstones from the batch of gemstones to individual compartments of the conveyor, and a controller is configured to synchronise a speed of the conveyor with an operation of the one or more measurement locations such that the measurements of the gemstones can be correlated with a location of the gemstones in their associated compartments.

The conveyor may comprise an endless loop.

The apparatus may further comprise a plurality of dispensing bins, configured to receive the gemstones transported to the one or more measurement locations, and a dispensing device located adjacent each of the plurality of dispensing bins, each dispensing device configured to dispense a gemstone within one of the plurality of discrete compartments into the adjacent dispensing bin, according to the measurement obtained at the one or more measurement locations.

The controller may be configured to synchronise an operation of the dispensing devices with the speed of the conveyor such that the gemstone in a compartment correlated with a particular measurement is dispensed into the appropriate dispensing bin.

The controller may be configured to send pulses to the motor, each pulse causing the motor to move the conveyor by a known amount. Each of the one or more measurement locations and each of the plurality of dispensing bins may be located a known number of pulses from a datum position.

At least one of the one or more measurement locations may comprise a plan imaging sensor and a plan illumination system, said imaging sensor configured to provide an image of a gemstone within its associated compartment from above.

At least one of the measurement locations may comprise a side imaging sensor and a side illumination system, said side imaging sensor configured to provide an image of the gemstone from the side.

The apparatus may comprise a processor configured to analyse measurements of the one or more properties of the gemstone taken at the one or more measurement locations. One of the one or more properties of the gemstone may be shape and the processor may be configured to perform a shape analysis of the gemstone. The shape analysis may include a comparison of a height of the stone measured by the side imaging system with a predicted height of the stone calculated from analysis of an image obtained by the plan imaging system.

The delivery device may comprise a circular bowl supplied with vibrational energy and having a groove, said groove configured to allow gemstones to travel along it.

The conveyor may be formed by a chain having a plurality of substantially identical links. Each link may be configured to clip to another link, such that an upper surface of the conveyor is substantially continuous when laid flat. Each link may be provided with at least one laterally extending ridge configured to separate two of the plurality of discrete compartments.

Each of the plurality of discrete compartments may be open-sided.

The apparatus may comprise a driven pulley wheel around which the conveyor is looped, the driven pulley wheel comprising a flat-sided polygon.

In accordance with another aspect of the present invention there is provided a method of sorting gemstones from a batch of gemstones, the method comprising: delivering individual gemstones from the batch of gemstones to individual discrete compartments of a conveyor; transporting the gemstones in the compartments to one or more measurement locations; measuring at the one or more measurement locations one or more properties of a gemstone; and synchronising a speed of the conveyor with an operation of the one or more measurement locations such that the measurements of the gemstones can be correlated with a location of the gemstones in their associated compartments.

The method may further comprise configuring the conveyor as an endless loop.

The method may further comprise dispensing a gemstone transported to the one or more measurement locations into one of a plurality of dispensing bins, according to the measurement obtained at the one or more measurement locations.

The method may further comprise synchronising an operation of the dispensing devices with the speed of the conveyor such that the gemstone in a compartment correlated with a particular measurement is dispensed into the appropriate dispensing bin.

The method may further comprise sending pulses to a motor which drives the conveyor, such that each pulse causes the motor to move the conveyor by a known amount.

The method may further comprise locating each of the one or more measurement locations and each of the plurality of dispensing bins a known number of pulses from a datum position.

The method may further comprise providing, at at least one of the one or more measurement locations, an image of a gemstone within its associated compartment from above, using a plan imaging sensor and a plan illumination system.

The method may further comprise providing, at at least one of the one or more measurement locations, an image of a gemstone from the side, using a side imaging sensor and a side illumination system.

The method may further comprise analysing, using a processor, measurements of the one or more properties of the gemstone taken at the one or more measurement locations. The analysing step may comprise a shape analysis of the gemstone.

The method may further comprise comparing a height of the stone measured by the side imaging system with a predicted height of the stone calculated from analysis of an image obtained by the plan imaging system.

The delivery step may comprise supplying a circular bowl having a groove with vibrational energy such that gemstones travel along the groove.

The method may further comprise forming the conveyor by a chain having a plurality of substantially identical links. The method may further comprise configuring each link to clip to another link, such that an upper surface of the conveyor is substantially continuous when laid flat. The method may further comprise providing each link with at least one laterally extending ridge configured to separate two of the discrete compartments.

The method may further comprise configuring the discrete compartments to be open-sided.

The method may further comprise looping the conveyor around a pulley wheel comprising a flat-sided polygon and driving the pulley wheel.

BRIEF DESCRIPTION OF THE DRAWINGS

FIG. 7a is a partial rear perspective view of the apparatus of FIG. 1;

FIG. 7b is a partial front view of the apparatus of FIG. 1;

FIG. 7c is an enlarged front view of the driven pulley wheel of FIG. 1;

DETAILED DESCRIPTION

Figure 1:
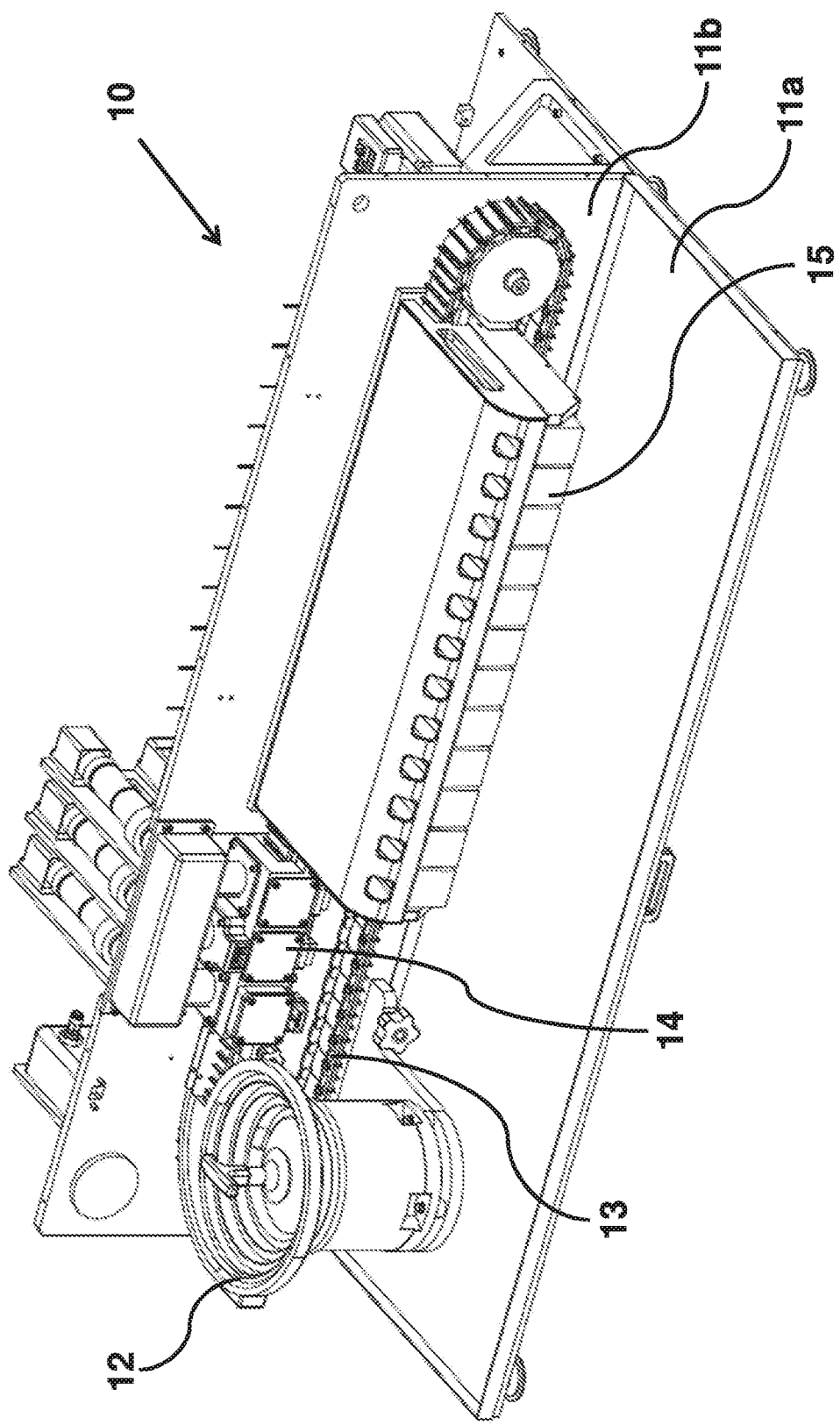
FIG. 1 is a perspective view of an apparatus for sorting gemstones.

An apparatus 10 for sorting gemstones, such as diamonds, will now be described with reference to FIGS. 1 to 13. As illustrated in FIG. 1, the apparatus 10 comprises one or more measurement locations 14, each comprising at least one sensor, and a conveyor 13 comprising a plurality of discrete compartments for transporting individual gemstones to the one or more measurement locations 14. The apparatus further comprises a delivery device 12 for delivering individual gemstones from a batch to the conveyor, and a plurality of dispensing bins 15 into which sorted gemstones are dispensed. The apparatus 10 also includes a controller (not shown here). The one or more measurement locations 14, conveyor 13, delivery device 12 and the at least one dispensing bin 15 are supported by a frame 11.

The frame 11 in this illustrated example comprises a substantially flat lower surface 11a and a substantially vertical surface 11b mounted along a longitudinal axis of the lower surface 11a and substantially perpendicular thereto.

Figure 2:
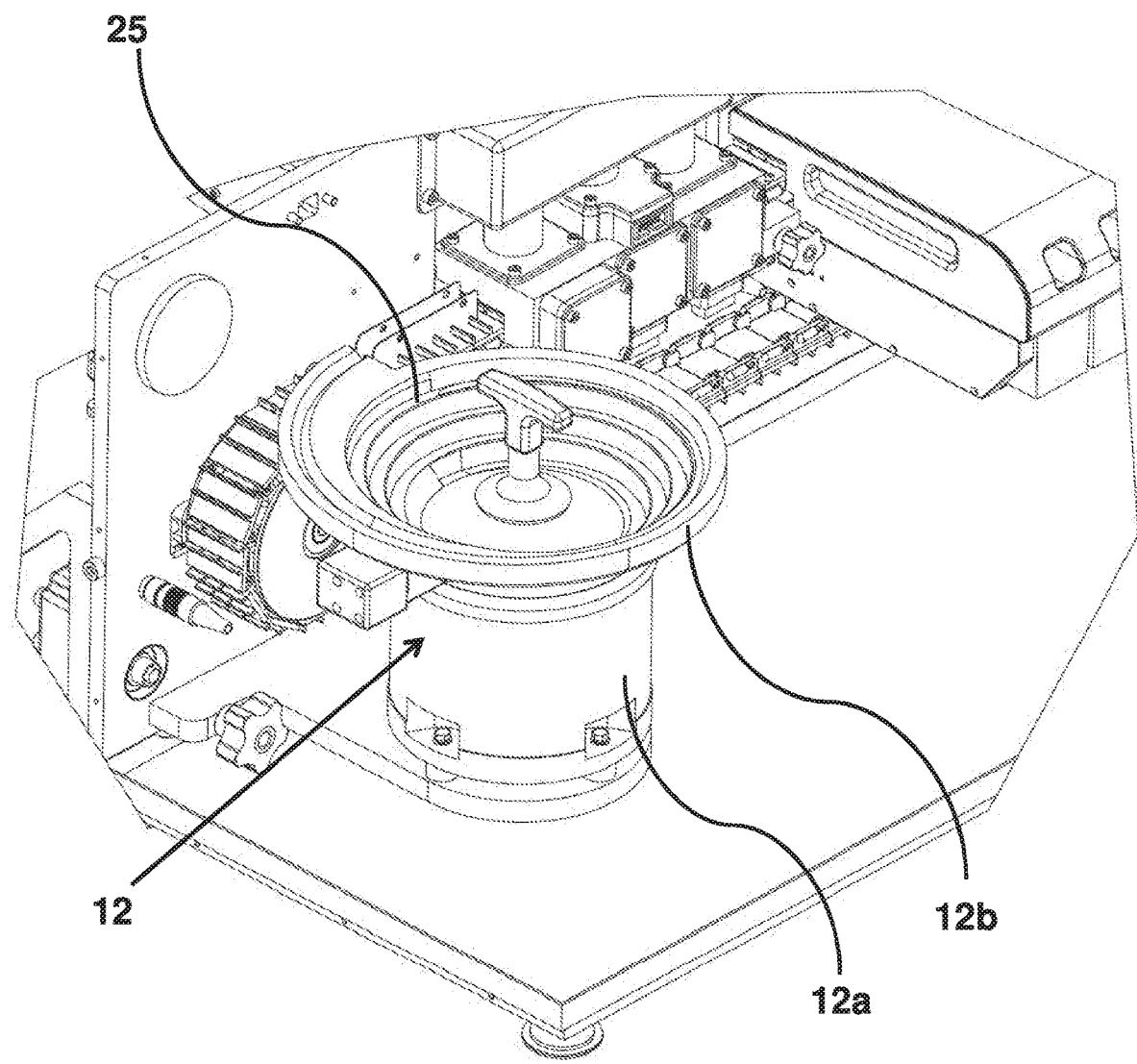
FIG. 2 is a partial view of the apparatus of FIG. 1, illustrating a vibratory bowl.
Figure 3:
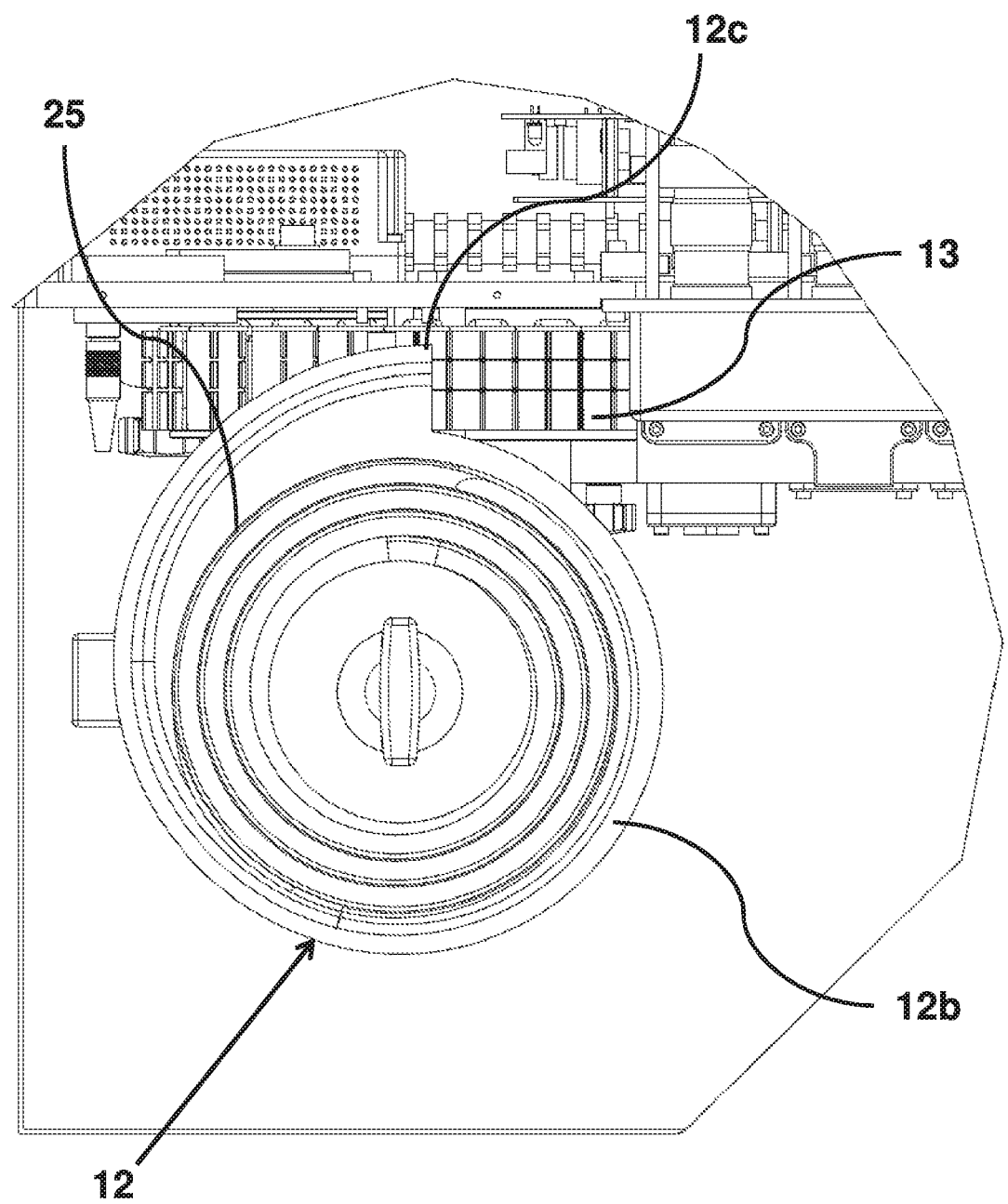
FIG. 3 is a partial plan view of the apparatus of FIG. 1.

As shown in FIGS. 2 and 3, in this example the delivery device comprises a vibratory bowl feeder 12, having a circular vibratory base 12a, such as a SI-200 Euro Series drive unit, and a circular upper bowl 12b, such as a SIS-200-10 Cast Bowl, both supplied by Aylesbury Automation Limited. The bowl feeder 12 is driven at a suitable amplitude and resonant frequency. Optionally, the amplitude of the bowl feeder 12 may be monitored and controlled using an accelerometer, such as an ADXL337 manufactured by Analog Devices, Inc (not shown).

A bowl feeder of this type operates on an electromagnetic principle, whereby a coil in the base 12a of the feeder 12, when energised, magnetizes a paramagnetic member and causes it to be attracted, and when driven periodically excites a resonant response in the bowl 12b. If the coil is excited with an alternating voltage or current at a given frequency, this interaction results in a driving force at twice the frequency of excitation.

Other excitation methods, such as a piezoelectric mechanism, or a voice coil mechanism such as would be found in a loudspeaker, may be employed. Regardless of the excitation method used, the base 12a is constructed using angled ligatures or the like so that the vibration of the upper bowl 12b has both a rotational and vertical element. This vibrational motion causes objects in the bowl 12b to move, depending on the orientation of the ligatures in, for example, a clockwise direction. The interior of the bowl 12b is provided with a spiral track 25 or groove at its periphery, spiraling both outwards and upwards in the same clockwise sense as illustrated in FIGS. 2 and 3, and discrete objects such as gemstones can be made to flow along it. In this example, the groove is v-shaped.

As is well known in the art, a resonant bowl feeder 12 can receive a parcel or batch of gemstones and separate them into a single stream along the v-shaped groove 25 in the bowl 12b. The v-shaped groove 25 travels in a spiral and the gemstones proceed along it to an edge 12c of the bowl 12b, from where individual gemstones fall substantially one at a time onto the conveyor 13 below, as illustrated in FIG. 3.

In alternative embodiments, not shown here, the outer shape of the bowl may be an inverted truncated cone, having a smaller radius at the bottom, matching the drive unit, and a larger radius at the top. In this case, when a stream of discrete gemstone is released from the edge of the bowl they fall into free space and thence onto a linear conveyor which travels at a tangent to the bowl in a generally horizontal or gently inclined plane. It will also be appreciated that other delivery devices for delivering individual gemstones from a batch may also be envisaged.

As best illustrated in FIG. 3, the conveyor 13 runs alongside the vibratory bowl 12b and passes underneath the bowl edge 12c. The conveyor 13 takes the form of a chain 21 having a plurality of substantially identical links 20. The precise number of links 20 may vary depending upon the number of measurement locations and the number of dispensing bins required, but may typically comprise around in the region of about eighty to one hundred links 20. The two ends of the chain 21 are connected to form an endless loop around two pulley wheels 19, 19i located at each end of the frame 11. The pulley wheels may each be approximately 100 mm in diameter. The overall length of the loop, i.e. the distance between the outer edges of the pulley wheels 19, 19i, may be about 900 mm. In the example with these dimensions, the conveyor 13 is approximately thus two metres long when removed from the frame 11 and separated into a single length.

It will be appreciated that the dimensions provided in the example herein described may be modified according to the application. For example, if additional dispensing bins were required, additional links could be added to the chain in order to increase the length of the conveyor.

In alternative embodiments, not shown here, the conveyor may comprise a cassette system rather than an endless loop. One or more cassettes may be configured to move along a track, transporting gemstones to one or more measurement locations and a plurality of dispensing bins. The one or more empty cassettes may then return along the track in an opposite direction. The motion of the cassette may be synchronised with the speed of a vibratory bowl so that individual gemstones are fed into the cassette as it passes the feeder.

Figure 4:
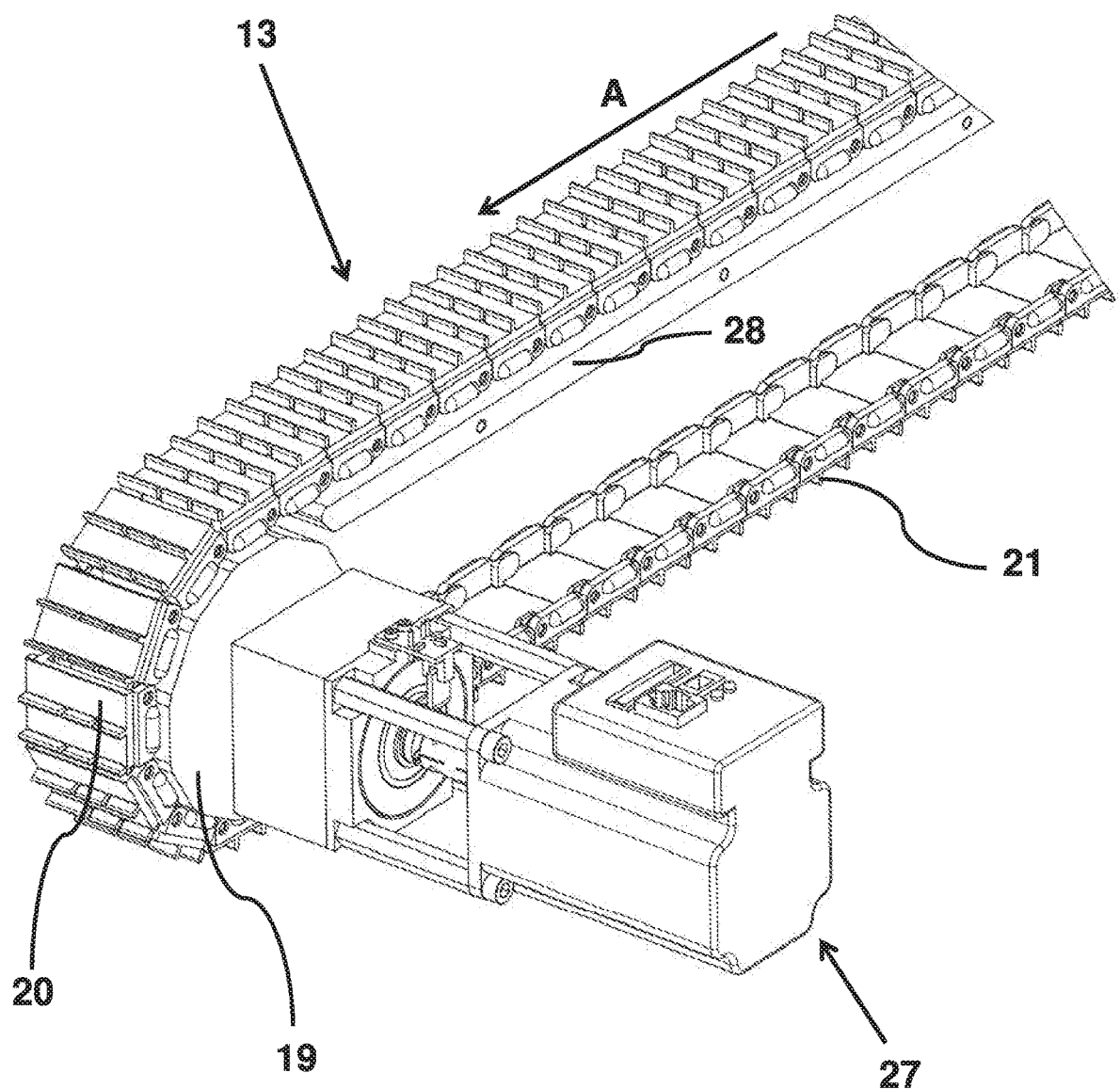
FIG. 4 is a partial rear view of the apparatus of FIG. 1, illustrating a conveyor.

In the embodiment shown in FIG. 4, the links 20 of the chain 21 move along a support surface or guide support 28 which in this example comprises a plane metal surface, such as a hard anodized, aluminium surface. Thus there will be some frictional resistance between the lower surface of the links 20 and the guide support 28 but this is generally negligible and the conveyor 13 thus moves relatively smoothly over the guide support 28. In other embodiments the tension in the chain may render the guide support unnecessary.

The upper surface of the assembled chain 21 when laid flat is substantially continuous and has no gaps into which objects could fall into or become jammed. As the conveyor chain 21 passes around the pulleys 19, 19i and is bent into a convex form, gaps will open and any object present could fall forward and through the gaps. Generally, the pivot points on the chain 21 will be below its upper surface and hence the chain 21 cannot be bent into a concave form.

The links 20 may clip together so that for example outward facing pegs at one end of a link 20 clip into suitable holes at the opposite end of the next link 20. Advantageously, suitable bearing inserts may be provided to reduce wear at this interface. The links 20 may be constructed using injection moulding. Each link 20 may be approximately 25 mm long and 50 mm wide and may be constructed from any convenient material, preferably a substantially transparent material which may be plastic, such as polycarbonate. It will be appreciated that a plurality of identical links 20 may be fabricated at low cost by injection moulding.

Figure 5:
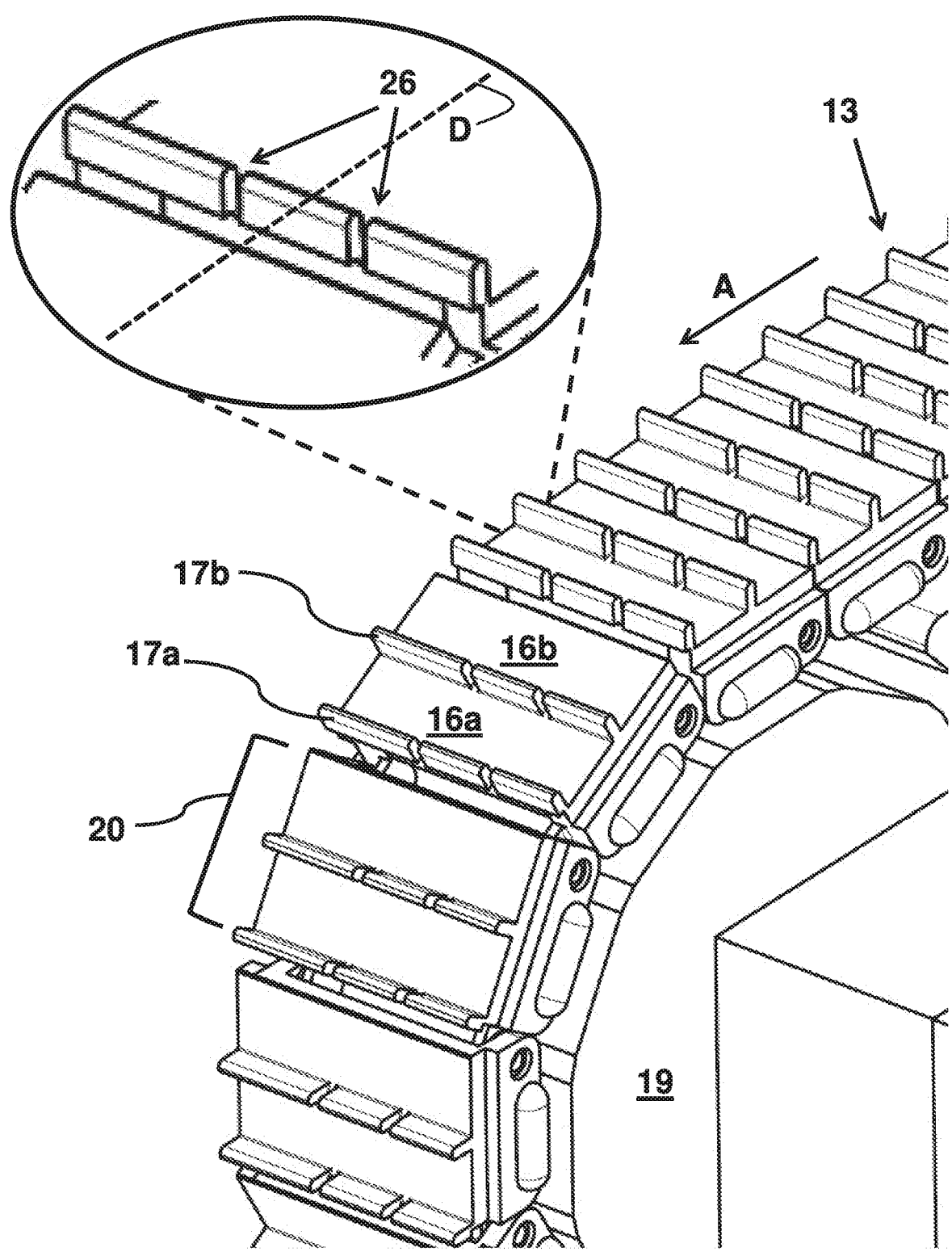
FIG. 5 is an enlarged view of a section of FIG. 4, including a call-out.

As illustrated in FIG. 5, each link 20 is provided with at least one laterally extending ridge or vertical upstand 17a, 17b on its upper surface. Each upstand 17a, 17b runs perpendicular to the direction of motion of the conveyor 13. In this example, two upstands 17a, 17b are provided, the first upstand 17a at the front edge of the link 20 and the second upstand 17b just forwards of the centre of the link 20. The upstands 17a, 17b may be about 5 to 10 mm in height and may have rounded tops. The front, or leading, edge of the link 20 is defined with reference to the direction of travel of the conveyor 13, indicated in FIGS. 4 and 5 by arrow A.

Each pair of upstands 17a, 17b defines a first (forward) discrete compartment or bay 16a on the link 20. The back edge of the link 20 is left flat but it will be appreciated that the forward upstand 17a of the next link 20 in the chain 21 completes a second (rearward) compartment 16b once the upper surface of the chain 21 becomes flat. The compartments 16a, 16b formed on each link 20 are approximately the same size as one another. Beneficially, the provision of an upstand 17a on the forward edge of the link 20 helps to prevent stones from falling into gaps between the links 20. It will be understood that where each link is provided with only one vertical upstand, each link comprises only one compartment or bay. It may even be the case that not all links are provided with an upstand, so that a compartment may be formed across two or more links.

While the front and rear of each compartment 16a, 16b is defined by an upstand 17a, 17b, in this example the sides of the compartment 16a, 16b are open to the direction perpendicular to the conveyor 13 movement, to facilitate viewing or imaging of the gemstone therein.

As discussed with reference to FIG. 3, individual gemstones fall substantially one at a time from an edge 12c of the feeder 12 onto the conveyor 13 below, coming to rest within a compartment 16a, 16b. It is desirable for the feeder 12 to be energised such that the rate of delivery of stones is substantially the same as the rate at which compartments 16a, 16b pass underneath the end of the feeder so that each compartment 16a, 16b contains a single stone. However, in practice, it is better for some compartments 16a, 16b to have no stones at all than for some compartments 16a, 16b to have two or more stones, so the rate of stone delivery may be chosen to be slower than the rate at which compartments 16a, 16b pass the feeder 12. It will be appreciated that, in these circumstances, not every compartment 16a, 16b will be filled, and some will be empty. For drop heights of about 5 mm to 10 mm from the feeder 12 to the conveyor 13, the process of the stone coming to rest in the compartment 16a, 16b can take around 0.5 seconds. The conveyor 13 may move at a speed of about eight compartments per second. In this example, the compartments 16a, 16b are approximately 12.5 mm from upstand 17a to upstand 17b. This results in a conveyor 13 forward velocity of around 100 mm per second. Settling of a gemstone which has fallen from the edge 12c of the feeder 12 occurs over a distance of about 50 mm.

As shown in FIG. 5, each upstand 17a, 17b is divided into three individual sections with a gap 26 of around 1 to 2 mm between each section. The gaps 26 are about 6 mm either side of a datum line which runs in the direction of travel of the conveyor 13. The datum line may be the centre line of the conveyor 13, or another convenient reference point. The datum line is this example is illustrated by line D in FIG. 5. In other embodiments, each upstand 17a, 17b may be divided into two individual sections with a larger gap between each section, or not divided at all.

Figure 6:
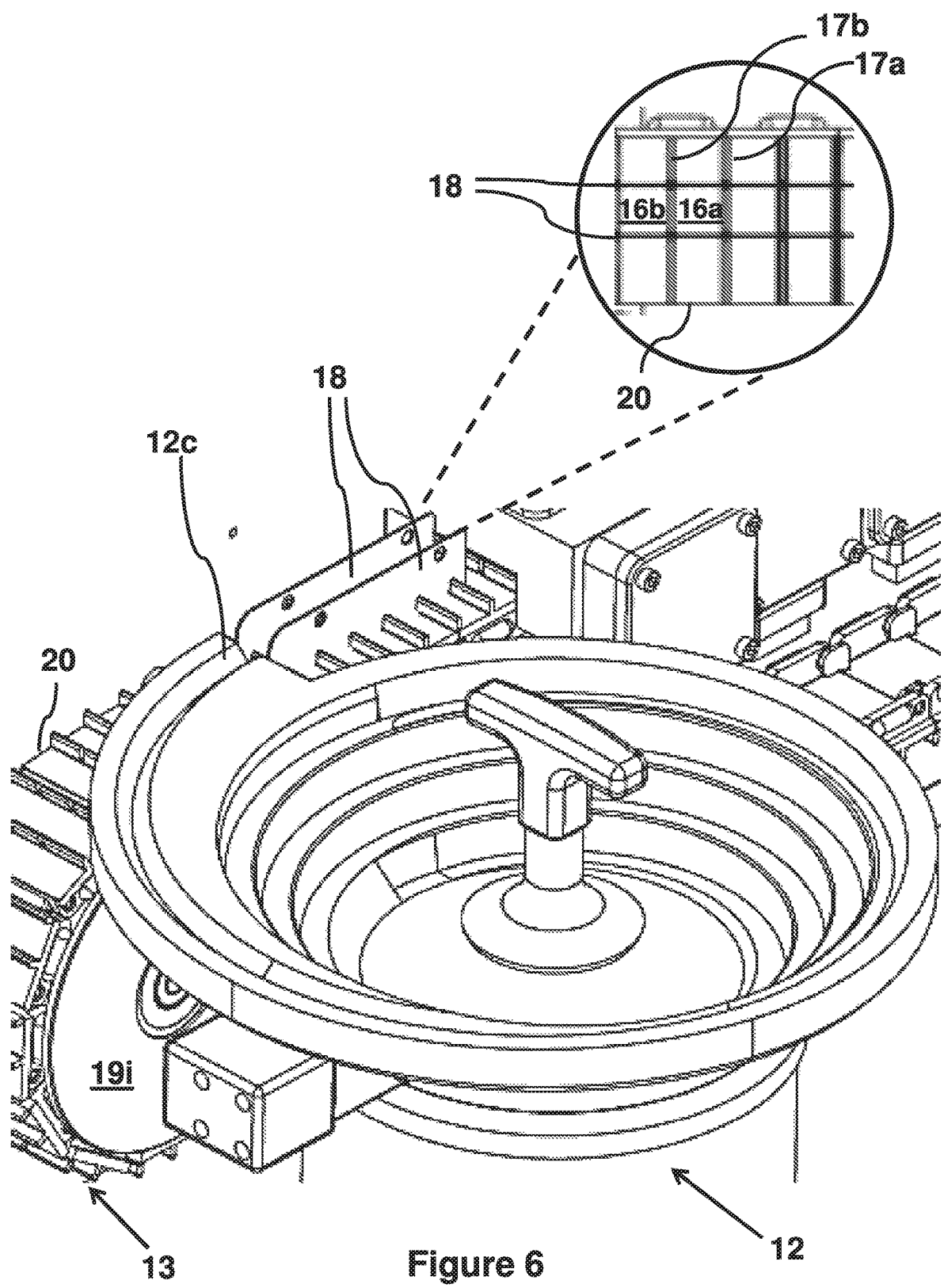
FIG. 6 is an enlarged partial view of the apparatus of FIG. 1, including a plan view call-out.

As best illustrated in FIG. 6, in order to facilitate settling of the gemstone within its compartment 16a, 16b, and to avoid any problems with the gemstone rolling out of an open side of the compartment 16a 16b, two parallel elongate guides 18 are located in the gaps 26 between the three upstand 17a, 17b sections as the links 20 pass along the guides 18. These guides 18 extend in a direction parallel to the motion of the conveyor 13 and are supported from above. The two guides 18 extend through a plurality of compartments 16a, 16b in the region adjacent the edge 12c of the feeder 12, and about 50 mm beyond it in the direction of travel of the conveyor 13.

The guides 18 may be constructed from thin strips of soft but reasonably rigid plastic such as ABS (acrylonitrile butadiene styrene). When inserted into the upstand gaps 26, the guides 18 may sit just above the upper surface of the link 20, or may rest or float upon it. As the conveyor 13 moves forwards, the guides 18 engage with and are inserted into the upstand gaps 26 of successive links 20. In other words, the guides 18 remain stationary while the conveyor 13 moves forwards.

During the transfer of the gemstone from the bowl 12 to a specific compartment 16a, 16b of the conveyor 13, the guides 18 form the sides of a region within a compartment 16a, 16b which is centred on the datum line D. This enables a gemstone which has fallen from the edge 12c of the feeder 12 into a compartment 16a, 16b of the conveyor 13 to settle in a particular region which is bounded by the forward and rearward upstands 17a, 17b and the guides 18, as illustrated in the call-out of FIG. 6. Once the gemstone has settled it is likely to remain in that region of the compartment 16a, 16b, even after the compartment 16a, 16b has moved beyond the guides 18. Even if the gemstone is slightly re-located or moved after the guides 18 no longer bound the compartment 16a, 16b, the location of the gemstone between the forward 17a and the rearward 17b upstands is still known. However, once a stone has settled within a compartment 16a, 16b it is most likely to be in its most stable configuration. Where the stone has facets this is likely to be resting on the largest facet although this will not always be the case.

The use of permanent guides, or sides, for each compartment 16a, 16b is undesirable because they would interfere with the view of the gemstone in a direction perpendicular to the conveyor 13 motion, in the plane of the conveyor 13. Permanent compartment sides would also interfere with subsequent removal of a gemstone into a dispensing bin, using for example an air jet or a mechanical actuator, such as a push bar. The guides 18 as described herein therefore allow a fully enclosed region within a compartment 16a, 16b to be present while the gemstone settles, without interfering with subsequent operations.

It can then be assumed that, once a gemstone has settled in a particular compartment or bay 16a, 16b, the gemstone will remain in that location throughout the remainder of the sorting process, until or unless action is taken to remove it. The purpose of the compartments 16a, 16b is therefore to divide the conveyor 13 into separate physical elements or discrete trays in order to track the location of a particular gemstone.

The combination of a vibratory feeder bowl 12 and a moving, compartmentalised, continuous conveyor 13 therefore converts a batch of gemstones into a continuous flow of individual stones, where the location of each stone is known at subsequent times, without the need for separation devices or methods.

The motion of the continuous conveyor 13 is controlled by the pulley wheel 19 which is driven, thereby causing the chain 21 to move. As shown in FIGS. 7a, 7b and 7c, in this example it is the pulley wheel 19 at the end of the apparatus 10 distal to the bowl 12 which is driven, although it will be appreciated that either wheel can be driven.

Drive is supplied to the pulley wheel 19 by an ungeared direct drive from a 2-phase stepper motor 27, via suitable bearings and a flexible coupling (not shown). To provide smooth motion, the well-known technique of micro-stepping may employed i.e. when one pulse is supplied to the motor controller quadrature, drive supplied to the drive coils is advanced by a small angle rather than by a full step.

In the example shown, the driven pulley wheel 19 takes the form of a simple polygon, in this example a twelve-sided polygon, with no teeth, as best shown in FIG. 7c. This arrangement assists in avoiding wear of the pulley wheel and the chain. The chain 21 loops or wraps around the pulley 19 and each link 20 of the chain 21 rests on a flat side or "facet" 19a, 19b, 19c . . . of the polygon which forms the pulley wheel 19. The links 20 and polygon facets 19a, 19b, 19c . . . are designed so that there is substantially full contact between the underside of the link 20 and the respective facet 19a, 19b, 19c . . . . This ensures that there is negligible or no sliding motion between the pulley 19 and the chain 21. It will be appreciated that alternative pulley wheel and chain arrangements, including toothed wheels, are possible. However, for synchronization purposes it is desirable that the pulley wheel 19 is meshed or aligned to the chain 21 in some way, so that the position of the conveyor compartments 16a, 16b may be inferred from the position of the motor shaft.

Figure 8:
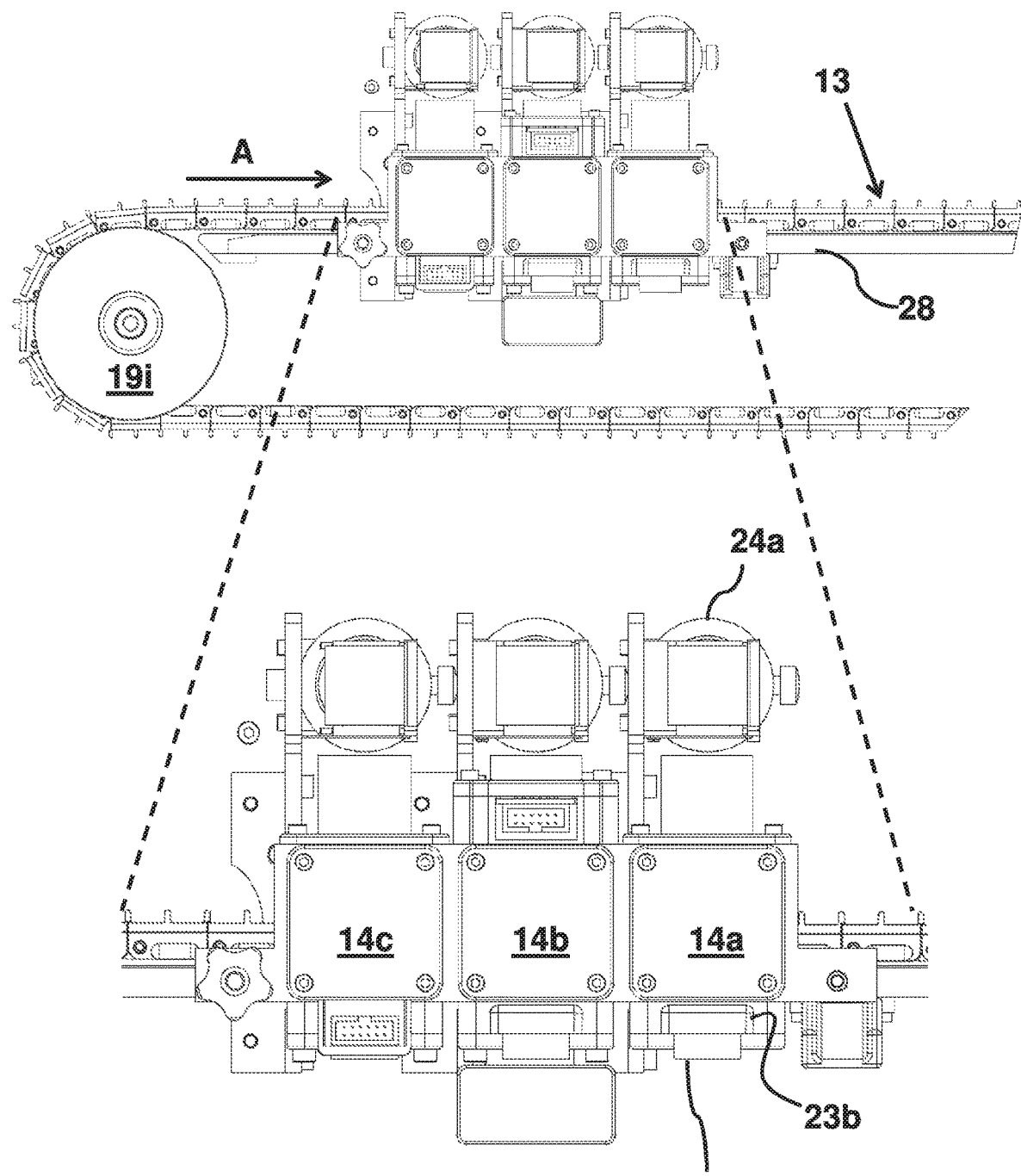
FIG. 8 is a partial front view of the apparatus of FIG. 1, including a call-out, illustrating a series of measurement locations.

The drive pulley 19 is positioned at the distal end of the conveyor 13 and so pulls it along in direction A, as indicated in FIGS. 7a and 7b. A second idler pulley 19i is provided at the proximal end of the apparatus 10, adjacent the vibratory bowl 12. This pulley 19i may be substantially circular (as shown in FIG. 8) or may also be polygonal or toothed.

It will be appreciated that the smoother the motion of the conveyor 13 along the support guide 28 and around the pulley wheels 19, 19i, the less likely it is for a stone which has settled within one of the discrete compartments 16a, 16b to be dislodged or disturbed after settling. The combination of a flat-sided, polygonal pulley wheel 19, a plane metal guide support 28 and a stepper motor 27 which supplies drive via micro-stepping as herein disclosed is therefore particularly advantageous.

In this illustrated example, both pulleys 19, 19i are mounted so their axes are perpendicular to an outward face of the vertical surface 11b of the frame 11, which defines a front of the apparatus 10. This arrangement allows the conveyor 13 to be accessed from the front of the apparatus 10 while all the drive mechanisms and the like are accessible from the rear of the apparatus 10. The vertical surface 11b acts as a partition so that gemstones or other foreign objects are prevented from falling to the rear of the apparatus 10. Removal of the conveyor 13 is also facilitated. Sufficient clearance is provided between the pulley wheels 19, 19i and the flat surface 11a or base of the frame 11 to permit stones which have fallen off the conveyor 13 to be found.

A home flag and sensor (not shown) is provided on the motor shaft or on the pulley wheel 19 so that the apparatus 10 may be initialized to a known home position. The flag may engage with an optical sensor which outputs data to the apparatus controller, so that it can confirm that the pulley wheel 19 is in its home position after initialization and that it remains in step without stalling for subsequent rotations of the pulley wheel 19.

Figure 9:
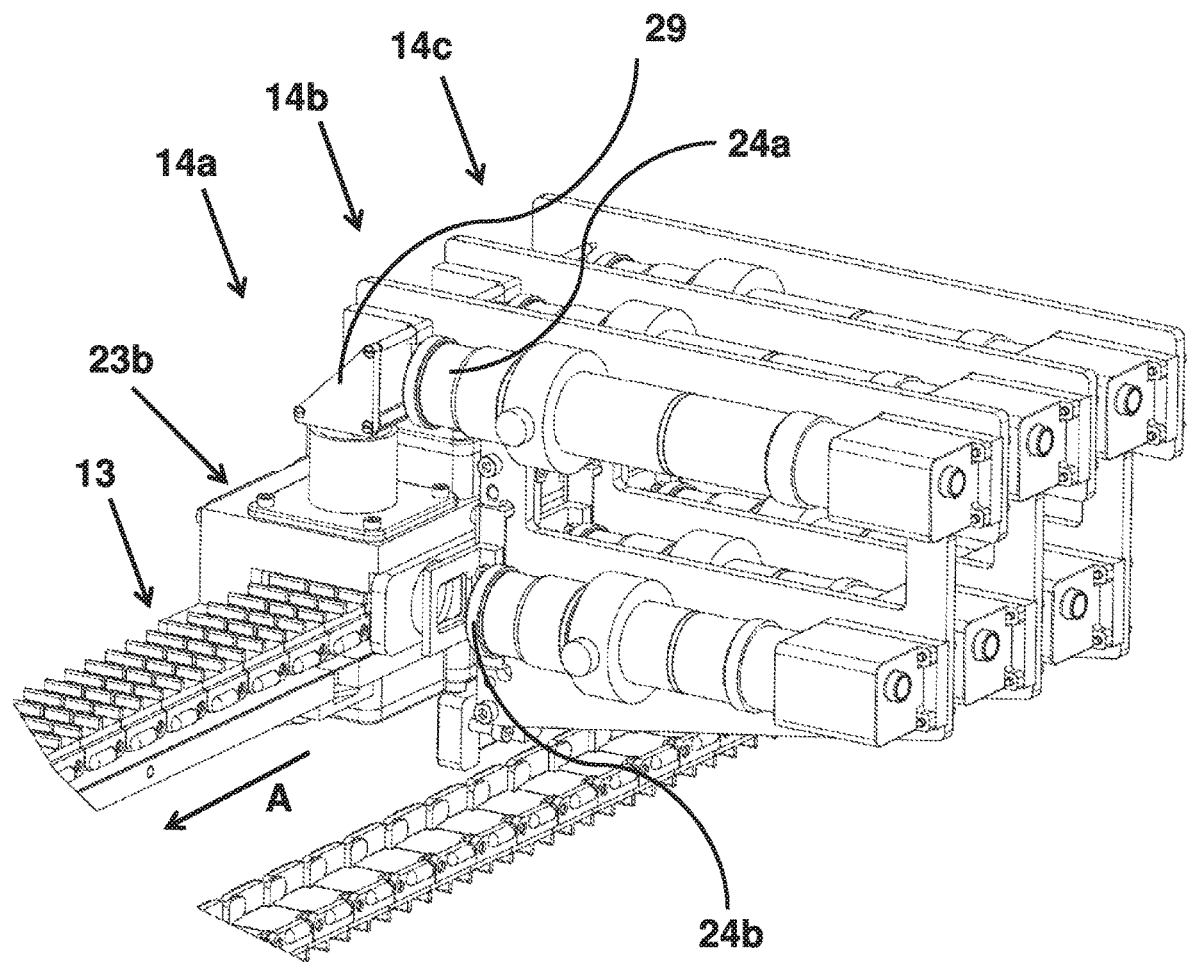
FIG. 9 is a partial rear view of the apparatus of FIG. 1, illustrating the series of measurement locations.
Figure 10:
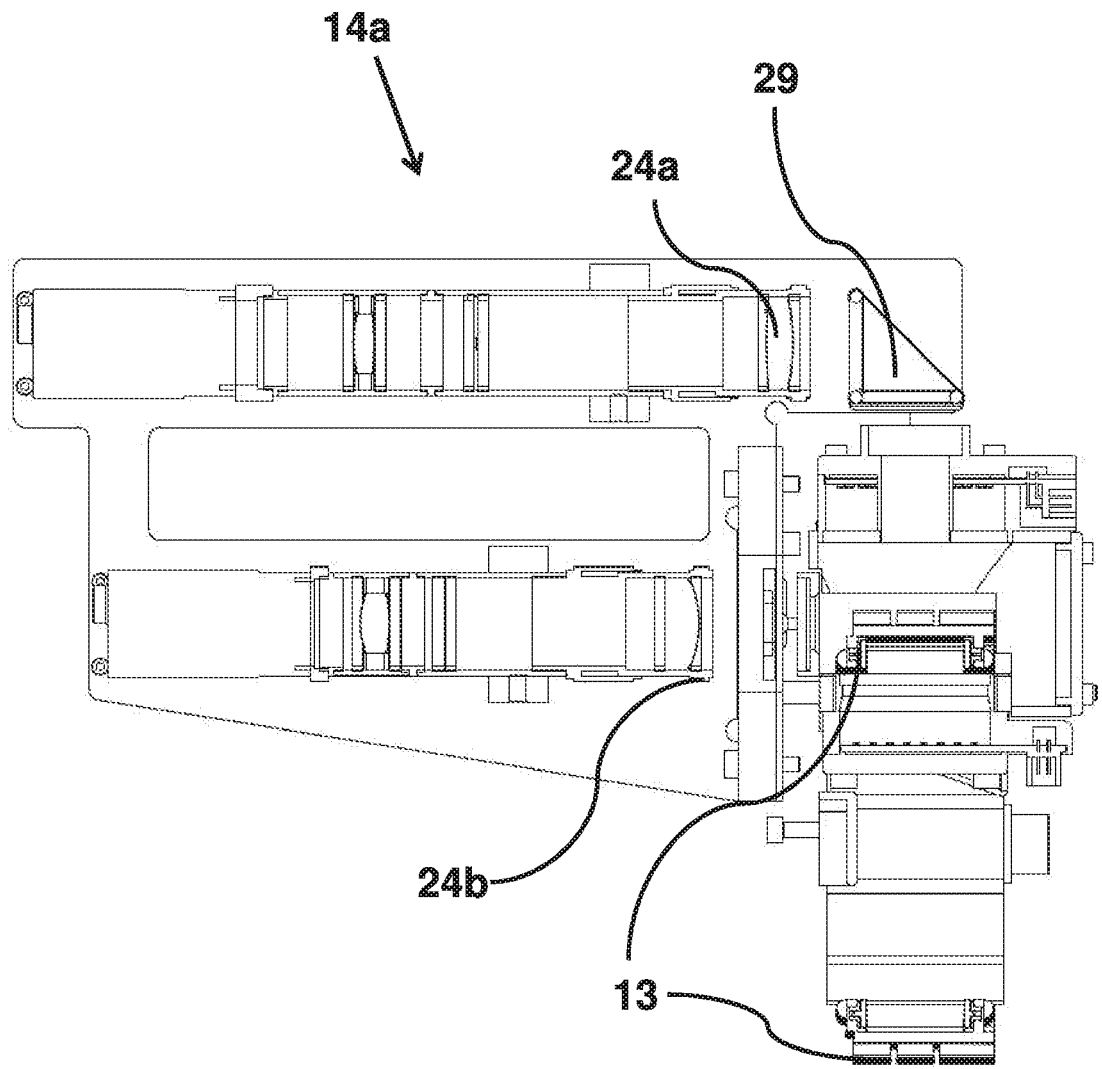
FIG. 10 is a partial side view of the apparatus of FIG. 1, illustrating a measurement location.

As best illustrated in FIGS. 8, 9 and 10, after passing below the edge 12c of the vibratory bowl and through the guides 18, the conveyor track 13 passes a number of measurement locations 14a, 14b, 14c. In this illustrated example, there are three such measurement locations 14a, 14b, 14c, but it will be appreciated that there may be fewer or more measurement locations, as required. By the time a compartment 16a, 16b containing a stone reaches the first measurement location 14a, the stone within the compartment 16a, 16b should have settled and should no longer be moving relative to the compartment 16a, 16b. Typically, the settled stone will be in its most stable orientation, but for the purposes of certain measurements, such as determining the shape, colour, clarity etc. of the stone, the orientation of the stone is not critical.

A first measurement location 14a may comprise an illumination system which may include a light source 23a to illuminate each compartment 16a, 16b from below. In this example, the first measurement location 14a comprises a housing through which the conveyor 13 passes. The light source 23a is recessed into the guide support 28 on which the conveyor 13 rests. The light source 23a provides a source of diffuse visible light via an array of approximately uniformly spaced light emitting diodes (LEDs) on a printed circuit board. To prevent any abrasion, the board is mounted some distance (approximately equal to or greater than the spacing between the LEDs) from an opal glass disc 23b, just below the guide support 28 surface. Typically, the diameter of the glass disc is around 40 mm.

The first measurement location 14a further comprises a plan imaging system, which may include an electronic imaging sensor or camera 24a. The sensor 24a may be located above the conveyor 13 so that a view or image of a compartment 16a, 16b and its contents may be obtained from above. However, in this example, as shown in FIGS. 9 and 10, a prism or mirror 29 is incorporated so that the sensor 24a can be mounted to the rear of the conveyor 13 track, rather than directly overhead. The sensor 24a in this example is a CMOS (complementary metal-oxide semiconductor) or CCD (charge-coupled device) detector comprising a two-dimensional, preferably square, array of identical light sensitive elements. The array may be provided with a mask known as a Bayer matrix so that different light sensitive elements are sensitive to different colours of light, in order to provide a colour image of the compartment 16a, 16b and its contents. In other embodiments, the compartment 16a, 16b may be illuminated from above and the sensor 24a may be located in any suitable position for providing an image of the contents of the compartment 16a, 16b from above, or from below.

The sensor or camera 24a includes suitable drive and communication circuitry so that it may be connected to a processor of a computer (not shown here) via a suitable interface, such as gigabit Ethernet. A suitable digital video camera is a UI-5260CP-C-HQ from IDS® Imaging Development Systems GmbH. It is straightforward to specify a suitable lens that can be attached to the camera 24a to form an image of the central portion of the conveyor 13 onto the sensor 24a. The lens may be attached directly to the camera using suitable extension tubes to provide an in-focus image of the compartment 16a, 16b on the image sensor 24a using standard equipment. A telecentric lens may be used as required to reduce perspective effects.

The first measurement location 14a as described above provides an image from above of a gemstone within one of the conveyor compartments. Since the links 20 of the conveyor 13 are constructed from a transparent material, the gemstone is suitably illuminated by the light source 23a directly below. The image taken by the sensor 24a, whether located directly overhead or not, can be processed by the processor to provide information regarding the properties of the gemstone, such as size, shape, colour and the like.

Since the conveyor 13 is moving while imaging of the gemstone is carried out the LEDs may be pulsed so that they are only activated when a conveyor link 20 is directly above them. This minimises the effect of the movement of the stone relative to the sensor 24a. It has been found that pulse durations of around 100-500 µs are suitable for LEDs such as Phillips Luxeon® Z, which are powerful enough to deliver sufficient light to form a suitable image. Longer pulse times such as 1 ms or more resulted in some blurring of the image.

While white LEDs may be used in the light source 23a it may be advantageous to use separate LEDs to provide red, green and blue illumination. Typically, separate drive pulses as described above are provided to each colour of LED, each starting at approximately the same time but terminating after different delays, so that the intensity of illumination of each colour can be adjusted to provide a colour balance. Provided the LEDs are arranged carefully on the printed circuit board and the opal diffuser is sufficiently distant, uniform illumination is obtained.

The control of the LEDs and all other aspects of the timing of the apparatus 10 of this example is carried out using a controller, such as an 8 bit microcontroller, for example a Atmel® Atmega 2560. The apparatus 10 further includes suitable drive circuitry and software as is known in the art.

In this example, the first measurement location 14a further comprises a second (side) imaging system 24b and a second (side illumination system 23b, as illustrated in FIG. 9. The side imaging system 24b includes a side imaging sensor or camera, focussed on the same position as the plan imaging system 24a but differently orientated i.e. the side sensor's 24b line of sight is parallel to the upstands 17a, 17b of the compartment so that the side sensor 24b can view between them. Thus, while the first (plan) imaging system 24a provides a plan view of a gemstone within a compartment 16a, 16b, the second (side) imaging system 24b provides a side elevation.

The second illumination system 23b or second light source may be a similar unit to the first or may be a different type of unit. In practice, the second illumination system must be placed further from datum line D of the conveyor track 13 and so the second illumination system 23b needs to be more directional. Since the variability in position of the gemstone within the compartment 16a, 16b is much greater than for the image from above provided by the first imaging system 24a, a smaller aperture is required for the second imaging system 24b in order to allow a suitable depth of focus and thus longer exposure times. Higher gain settings may be required in the second sensor or camera 24b, assuming the same magnification is used as for the first sensor or camera 24a.

It will also be appreciated that, although the plan and side imaging systems are described as being at the same measurement location, they could be at different measurement locations.

The two images provided by the first 24a and the second 24b imaging systems at the first measurement location 14a may be used to provide considerable information about the size and shape of the gemstone. For example, the processor may perform a shape analysis of the stone, based upon the images provided. To this end it is advantageous that the gemstone being inspected is resting on a nominally flat surface in a configuration that at least locally minimizes its gravitational potential energy. For example, a gemstone crystal in the form of a regular octahedron (which is a relatively common natural diamond morphology) will present with one of its eight faces resting on the floor of the compartment 16a, 16b. Thus, in plan view, the gemstone will have a characteristic hexagonal silhouette which can be used to distinguish it from other shapes.

The side (elevation) view of the gemstone provided by the second imaging system 24b will often show some sort of trapezium depending on the orientation of the gemstone. If the stone is a perfectly regular octahedral crystal, the height of the gemstone in the side or elevation view can be predicted from an analysis of the plan or overhead view. If it is determined, for example, that the actual height of the gemstone (as measured in the side view) is less than the height predicted from analysis of the plan view, then the gemstone may be a "flat" crystal rather than a perfectly regular one. A "long" crystal is another common morphology, in which the gemstone is elongated. This morphology will usually be visible in the plan or overhead view.

The plan and elevation images of the gemstone produced at the first measurement location 14a may therefore be combined, or separately analysed, in order to provide information about the size and shape of the stone. While a limited data set of two images will not allow the construction of a fully detailed representation or three-dimensional model of a gemstone's shape, these images when combined with the "scene constraint" of the object resting on a surface, and some a priori knowledge of the shapes likely to be present, allow useful inferences to be made. Therefore, the provision of two shape measurements is usually sufficient to enable the shape of the stone to be determined and for the stone to be sorted on this basis. Since both plan and elevation images are taken at the same location and at substantially the same time, subsequent movement of the gemstone within the compartment does not affect the analysis of the image or images.

In addition to the measurements taken at the first measurement location 14a, it will be appreciated that further measurements of the gemstone may be taken at further measurement locations such as the second 14b and third measurement 14c locations. These measurements may include, but are not limited to, fluorescence measurements, phosphorescence measurements, spectroscopic measurements and the like. A number of measurements may be taken at each measurement location, and further measurement locations may be added as required.

Figure 11:
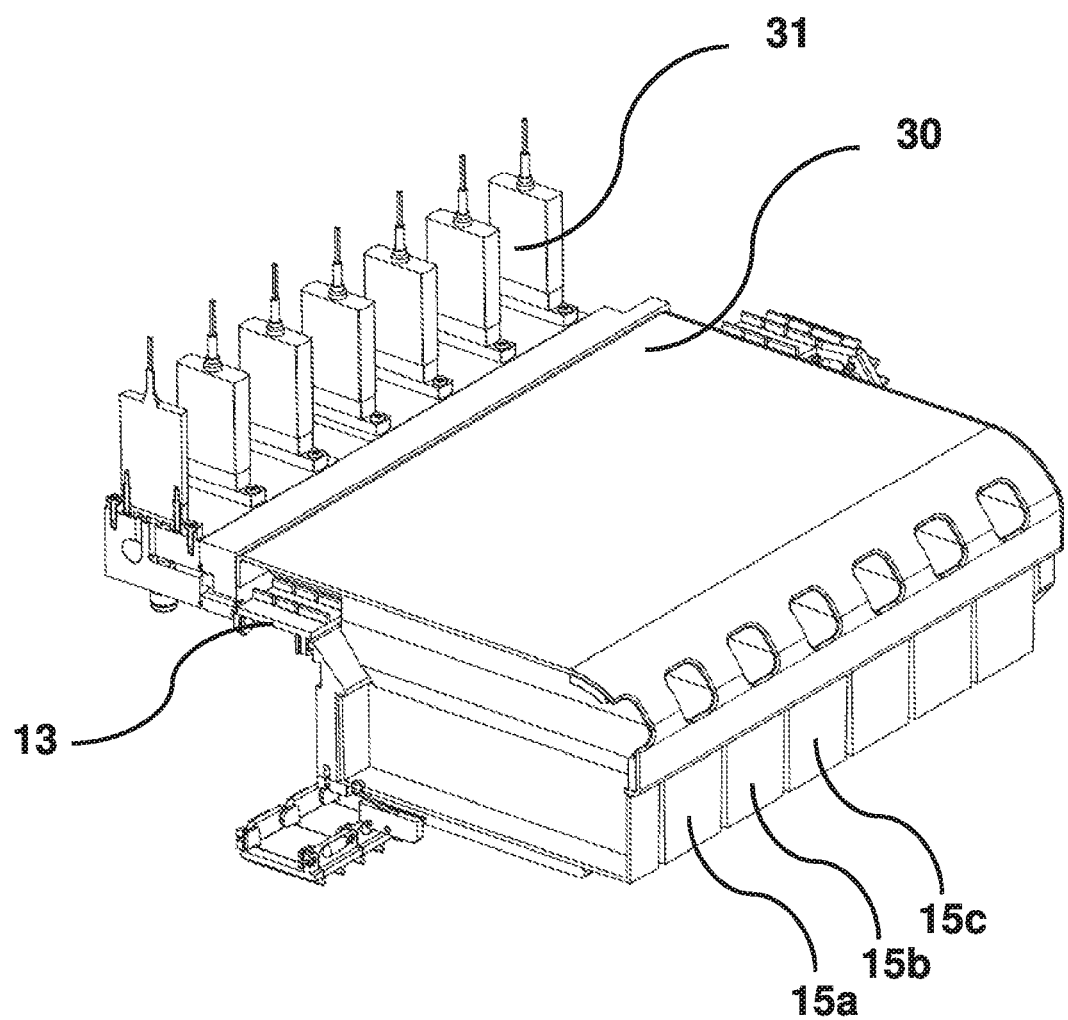
FIG. 11 is partial perspective view of the apparatus of FIG. 1, illustrating part of a series of dispensing bins.
Figure 12:
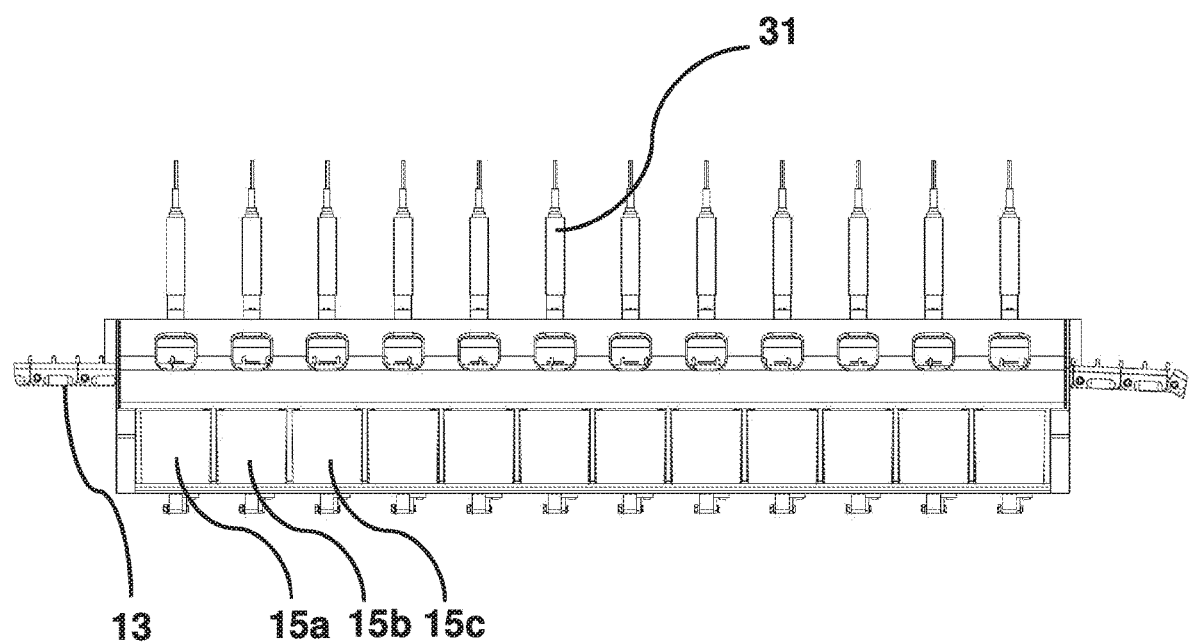
FIG. 12 is a partial front view of the apparatus of FIG. 1, illustrating a series of dispensing bins.
Figure 13:
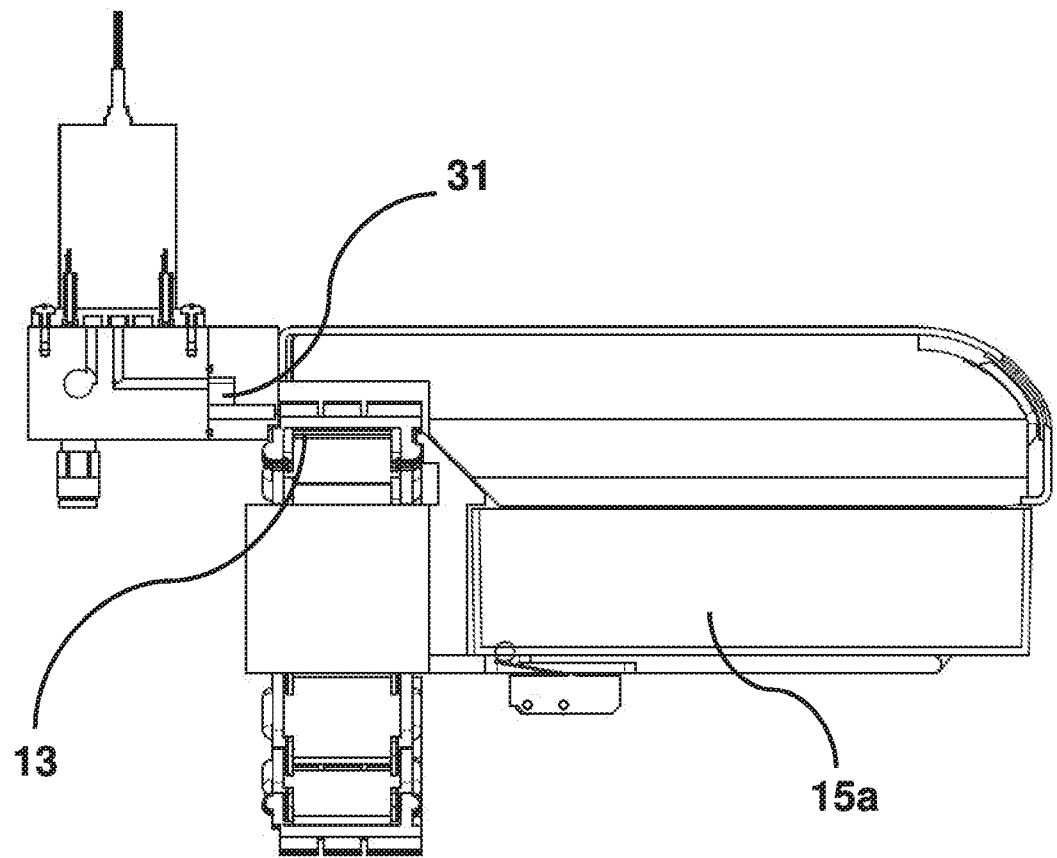
FIG. 13 is a partial side view of the apparatus of FIG. 1, illustrating a dispensing bin.

Each gemstone, once it has passed through the measurement locations 14a, 14b, 14c, continues in its compartment 16a, 16b upon the conveyor 13 to a plurality of dispensing bins 15a, 15b, 15c . . . . In this illustrated example, there are twelve dispensing bins 15a, 15b, 15c . . . , six of which are illustrated in FIG. 11. The dispensing bins may include a lid or cover 30. The lid 30 may be hinged, or may slide or lift off the bins 15a, 15b, 15c. The lid 30 may further comprise viewing panels or windows, such that an interior of each of the dispensing bins 15a, 15b, 15c is visible from outside.

Each dispensing bin 15a, 15b, 15c is designated to receive one or more gemstones which have passed through the one or more measurement locations 14a, 14b, 14c. A gemstone is dispensed into a particular dispensing bin 15a, 15b, 15c according to its properties, as determined by the measurements taken at the one or more measurement locations 14a, 14b, 14c. For example, a dispensing bin 15a, 15b, 15c may be designated to receive gemstones according to shape, colour, size, clarity, composition and so on. Accordingly, each bin 15a, 15b, 15c may be labelled or otherwise marked to indicate its contents. One of the dispensing bins 15a, 15b, 15c may also be specifically designated to receive "double feeds" i.e. those gemstones from compartments which contain more than one gemstone. Such "double feeds" may be dispensed into the appropriate bin and then subsequently reintroduced to the bowl feeder 12.

Adjacent each dispensing bin is a dispensing device 31. The dispensing device 31 in this example comprises an air jet (not shown here), located to the side of the conveyor 13. As a gemstone passes the appropriate dispensing bin 15a, 15b, 15c, the air jet is activated by the apparatus controller and the gemstone is blown off the open side of the compartment 16a, 16b adjacent the bin 15a, 15b, 15c and into the dispensing bin 15a, 15b, 15c. It will be appreciated that alternative dispensing devices such as push bars and the like may be used to remove the gemstone from its compartment 16a, 16b into the appropriate dispensing bin 15a, 15b, 15c.

Once the conveyor 13 has passed the dispensing bins 15a, 15b, 15c, each compartment 16a, 16b should be empty. Any gemstones which for any reason have not been dispensed into a bin 15a, 15b, 15c will fall off the conveyor 13 as it is pulled around the driven pulley wheel 19, onto the base 11a of the apparatus 10. The empty conveyor 13 continues towards the idle pulley wheel 19i and back around towards the bowl feeder 12, from which further gemstones may be dispensed.

It is desirable to provide a system for synchronising the operation of the illumination system 23 with the arrival of a compartment 16a, 16b at a measurement location 14a, and to trigger the imaging system 24. It is also important that the controller is able to associate an image or other measurement, or the result of any analysis or processing of the image or other measurement, with a specific compartment 16a, 16b, and hence with a particular gemstone. This association should also be linked to a trigger for the dispensing device 31, so that the gemstone is dispensed into the appropriate dispensing bin 15a, 15b, 15c.

In the current example this is achieved as follows. The controller sends pulses to the motor 27. Each pulse causes the motor 27 to turn the pulley wheel 19 by a known small angle, thus moving the conveyor 13. The motor 27 is configured so that a movement of a known number of pulses (for example 256) corresponds to a linear movement of the conveyor of one compartment length. In order to calibrate the apparatus 10, the controller sends pulses to the motor 27 until the home flag on the motor shaft or pulley 19 is detected by the sensor, as discussed above. A further predetermined number of pulses are delivered to the motor 27 so that a compartment 16a, 16b on the conveyor 13 is in a known relative position to a datum mark on the apparatus 10. This compartment 16a, 16b becomes compartment zero. All other positions of note in the system (e.g. first measurement location 14a, first dispensing bin 15a) are defined by how many pulses have to be delivered to the motor 27 to move compartment zero from the datum mark to that position of note.

For example, it may be that the first imaging system 24a is located at position 2000. In other words, 2000 pulses are required to be sent from the controller to the motor 27 in order to move compartment zero from the datum mark to the first imaging system 24a. A first dispensing bin 15a may be located at position 5000, and a second dispensing bin may be located at position 6000, and so on.

From now on pulses are sent automatically by the controller to the motor 27 at a rate determined by an internal counter in the microcontroller which is linked to a system clock. This sets the linear speed of motion of the conveyor 13, automatically generating drive pulses for the motor 27. It will be appreciated that the conveyor 13 in this example moves at a constant speed without any requirement to stop while measurements are taken. However, in other examples the conveyor may be halted while a measurement of a gemstone is taken, if required.

As each pulse edge is generated an interrupt in the microcontroller is required, so that the controller can check to see if action is required. For example, at pulse 2000, the camera 24a and light source 23a will be triggered as compartment zero passes. The trigger point for the camera 24a and light source 23a is then advanced by 256 pulses, which corresponds to the arrival of the subsequent compartment, compartment one. The image taken by the camera 24a as compartment zero passed its position is transferred to the processor, where it can be identified as pertaining to compartment zero (since it is the first image). The second image is transferred in the same way and can be identified as pertaining to compartment one, and so on.

Following analysis or processing of the image, or a number of images or measurements relating to compartment zero, the processor may determine that the gemstone within compartment zero should be dispensed into the second dispensing bin ("bin two") 15b. The processor therefore sends a message to the controller to dispense the contents of compartment zero into bin two (for example, the message may take the form DISP 0,2). The controller can identify bin two as being at position 6000, i.e. compartment zero will be in front of the air jet that blows the stone into bin two when the pulse count from the datum mark is 6000. The controller maintains a list of tasks in order of triggering, and adds a task such that the air jet for bin two will be triggered at pulse 6000 (when compartment zero has moved 6000 pulses from the datum mark).

As previously discussed, the camera 24 will be triggered again by the controller 256 pulses after the passage of compartment zero, at pulse 2256. This will result in an image being obtained of the contents of compartment one. Following analysis or processing of this image, the processor may determine that the gemstone within compartment one should be dispensed into the first dispensing bin ("bin one") 15a.

The processor therefore sends a message, for example DISP 1,1, to the controller. The location for bin one is pulse 5000. However, because it is the contents of compartment one, not compartment zero, that are being dispensed, the controller adds 256 pulses to the count, such that the air jet for bin one is triggered at a pulse count of 5256. In this example, the trigger point to dispense the second stone (5256) from compartment one occurs before the trigger for the first stone (6000) from compartment two. By maintaining an ordered task list the microcontroller can ensure that the correct stone is dispensed into the correct dispensing bin.

The above system can be extended to cover multiple measurement locations and multiple dispensing bins, such that multiple cameras or sensors are synchronised, as long as the processor maintains a separate data stream for each sensor. Thus, the results of the analysis of several cameras or sensors may be combined and the resulting dispensing location sent back from the processor to the controller.

Although not essential to the operation of the apparatus 10, the processor may be configured to send a message to the controller even where a compartment 16a, 16b is determined to be empty i.e. the image provided by the camera shows no stone is present. Thus, a message such as DISP 2,0 may be returned from the processor to the controller to indicate that compartment two is empty. The benefit of this arrangement is that by counting the messages received the microcontroller may verify that the processor of the computer is still working. If the processor stops working for any reason, it will not return messages to the controller. If this happens the microcontroller (which has no operating system) may simply stop the motion of the track 13 until the processor "wakes up" and starts to return messages again. This allows low cost general purpose computers to be used for the image analysis, rather than dedicated deterministic real time systems.

A further advantage of configuring the processor to send a message to the controller even where a compartment 16a, 16b is empty is that the microcontroller can determine the current feed utilisation, in other words, the fraction of compartments 16a, 16b that are occupied by stones. The controller can then, for example, adjust the amplitude of the vibratory bowl 12 in order to maintain a target feed rate. This is particularly advantageous when the apparatus 10 may be used to inspect objects which vary in size from batch to batch. Such a feedback mechanism may, for example, decrease the speed of the delivery device 12 and/or the linear speed of the conveyor 13 if a large number of compartments 16a, 16b are found to hold more than one stone; conversely, the speed of the delivery device 12 and/or the conveyor 13 may be increased if a large number of compartments 16a, 16b are found to be empty.

A method of sorting gemstones from a batch of gemstones, as herein described, comprises the steps of:

Step 1: delivering individual gemstones from the batch of gemstones to individual discrete compartments of a conveyor;

Step 2: transporting the gemstones in the compartments to one or more measurement locations;

Step 3: measuring at the one or more measurement locations one or more properties of a gemstone; and Step 4: synchronising a speed of the conveyor with an operation of the one or more measurement locations such that the measurements of the gemstones can be correlated with a location of the gemstones in their associated compartments.

The transportation of gemstones within discrete compartments to one or more measurement locations has a number of advantages over conventional transportation systems, as follows. All parts of the stone are potentially viewable, especially if the compartment is made from transparent material, and potential blind spots (which may arise for example where the stone is handled by a vacuum nozzle) can be eliminated. Further, movement of the stone within a discrete compartment as it is being transported does not affect either the measurement or dispensing of the stone, since its location within the specific compartment is still known.

It will be appreciated by the person skilled in the art that various modifications may be made to the above described embodiment, without departing from the scope of the present invention.

As described herein, a "front" view illustrates the apparatus as seen from the long side adjacent the feeder bowl. A "rear" view illustrates the apparatus as seen from the opposite side. An "end" view illustrates the apparatus viewed from either of its short sides.

The invention claimed is:

1. An apparatus for sorting gemstones from a batch of gemstones, comprising:
   one or more measurement locations, each comprising at least one sensor configured to measure one or more properties of a gemstone;
   a conveyor comprising a plurality of discrete compartments for containing the gemstones, the conveyor being driven by a motor so as to transport the gemstones in the compartments to the one or more measurement locations;
   a delivery device configured to deliver individual gemstones from the batch of gemstones onto individual compartments of the conveyor; and
   a controller configured to synchronise a speed of the conveyor with an operation of the one or more measurement locations such that the measurements of the gemstones can be correlated with a location of the gemstones in their associated compartments;
   wherein the controller is configured to send pulses to the motor, each pulse causing the motor to move the conveyor by a known amount.

2. The apparatus according to claim 1, wherein the conveyor comprises an endless loop.

3. The apparatus according to claim 1, comprising:
   a plurality of dispensing bins, configured to receive the gemstones transported to the one or more measurement locations, and
   a dispensing device located adjacent each of the plurality of dispensing bins, each dispensing device configured to dispense a gemstone within one of the plurality of discrete compartments into the adjacent dispensing bin, according to the measurement obtained at the one or more measurement locations.

4. The apparatus according to claim 3, wherein the controller is configured to synchronise an operation of the dispensing devices with the speed of the conveyor such that the gemstone in a compartment correlated with a particular measurement is dispensed into the appropriate dispensing bin.

5. The apparatus according to claim 1, wherein each of the one or more measurement locations and each of the plurality of dispensing bins is located a known number of pulses from a datum position.

6. The apparatus according to claim 1, wherein at least one of the one or more measurement locations comprises a plan imaging sensor and a plan illumination system, said imaging sensor configured to provide an image of a gemstone within its associated compartment from above.

7. The apparatus according to claim 1, wherein at least one of the measurement locations comprises a side imaging sensor and a side illumination system, and wherein said side imaging sensor is configured to provide an image of the gemstone from the side.

8. The apparatus according to claim 1, comprising a processor configured to analyse measurements of the one or more properties of the gemstone taken at the one or more measurement locations.

9. The apparatus according to claim 8, wherein one of the one or more properties of the gemstone is shape and the processor is configured to perform a shape analysis of the gemstone.

10. The apparatus according to claim 9, wherein the shape analysis includes a comparison of a height of the stone measured by a side imaging system with a predicted height of the stone calculated from analysis of an image obtained by a plan imaging system.

11. The apparatus according to claim 1, wherein the delivery device comprises a circular bowl supplied with vibrational energy and having a groove, said groove configured to allow gemstones to travel along it.

12. The apparatus according to claim 1, wherein the conveyor is formed by a chain having a plurality of substantially identical links.

13. The apparatus according to claim 12, wherein each link is configured to clip to another link, such that an upper surface of the conveyor is substantially continuous when laid flat.

14. The apparatus according to claim 12, wherein each link is provided with at least one laterally extending ridge configured to separate two of the plurality of discrete compartments.

15. The apparatus according to claim 1, where each of the plurality of discrete compartments is open-sided.

16. The apparatus according to claim 1, comprising a driven pulley wheel around which the conveyor is looped, the driven pulley wheel comprising a flat-sided polygon.

17. A method of sorting gemstones from a batch of gemstones, the method comprising:
   delivering individual gemstones from the batch of gemstones onto individual discrete compartments of a conveyor;
   transporting the gemstones in the compartments to one or more measurement locations;
   measuring, at the one or more measurement locations, one or more properties of a gemstone;
   synchronising a speed of the conveyor with an operation of the one or more measurement locations such that the measurements of the gemstones can be correlated with a location of the gemstones in their associated compartments; and
   sending pulses to a motor which drives the conveyor, such that each pulse causes the motor to move the conveyor by a known amount.

18. The method according to claim 17, wherein the conveyor comprises an endless loop.

19. The method according to claim 17, further comprising dispensing a gemstone transported to the one or more measurement locations into one of a plurality of dispensing bins, according to the measurement obtained at the one or more measurement locations.

20. The method according to claim 19, further comprising synchronising an operation of the dispensing devices with the speed of the conveyor such that the gemstone in a compartment correlated with a particular measurement is dispensed into the appropriate dispensing bin.

21. The method according to claim 17, further comprising locating each of the one or more measurement locations and each of the plurality of dispensing bins a known number of pulses from a datum position.

22. The method according to claim 17, further comprising providing, at at least one of the one or more measurement locations, an image of a gemstone within its associated compartment from above, using a plan imaging sensor and a plan illumination system.

23. The method according to claim 17, further comprising providing, at least one of the one or more measurement locations, an image of a gemstone from the side, using a side imaging sensor and a side illumination system.

24. The method according to claim 17, further comprising analysing, using a processor, measurements of the one or more properties of the gemstone taken at the one or more measurement locations.

25. The method according to claim 24, wherein the analysing step comprises a shape analysis of the gemstone.

26. The method according to claim 25, further comprising comparing a height of the stone measured by a side imaging system with a predicted height of the stone calculated from analysis of an image obtained by a plan imaging system.

27. The method according to claim 17, wherein the delivery step comprises supplying a circular bowl having a groove with vibrational energy such that gemstones travel along the groove.

28. The method according to claim 17, further comprising forming the conveyor by a chain having a plurality of substantially identical links.

29. The method according to claim 28, further comprising configuring each link to clip to another link, such that an upper surface of the conveyor is substantially continuous when laid flat.

30. The method according to claim 28, further comprising providing each link with at least one laterally extending ridge configured to separate two of the discrete compartments.

31. The method according to claim 30, further comprising configuring the discrete compartments to be open-sided.

32. The method according to claim 17, further comprising looping the conveyor around a pulley wheel comprising a flat-sided polygon and driving the pulley wheel.

* * * * *